(12) United States Patent
Yildiz et al.

(10) Patent No.: US 8,250,576 B2
(45) Date of Patent: Aug. 21, 2012

(54) STRUCTURED TASK HIERARCHY FOR A PARALLEL RUNTIME

(75) Inventors: Huseyin S. Yildiz, Kenmore, WA (US); Stephen H. Toub, Seattle, WA (US); John J. Duffy, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 414 days.

(21) Appl. No.: 12/571,258

(22) Filed: Sep. 30, 2009

(65) Prior Publication Data

US 2011/0078691 A1 Mar. 31, 2011

(51) Int. Cl.
G06F 9/46 (2006.01)
G06F 9/44 (2006.01)
G06F 11/00 (2006.01)
G06F 15/00 (2006.01)
G06F 9/30 (2006.01)
G06F 9/40 (2006.01)

(52) U.S. Cl. ........ 718/100; 718/103; 718/106; 712/224; 714/37; 714/38.1; 717/124; 717/127; 717/131

(58) Field of Classification Search ........................ None
See application file for complete search history.

(56) References Cited

U.S. PATENT DOCUMENTS

| | | | |
|---|---|---|---|
| 4,965,718 A | | 10/1990 | George |
| 5,193,186 A | * | 3/1993 | Tamaki et al. ................. 718/106 |
| 5,602,754 A | * | 2/1997 | Beatty et al. .................. 716/108 |
| 7,451,445 B1 | * | 11/2008 | Eppstein ....................... 718/100 |
| 7,627,857 B2 | * | 12/2009 | Rokosz .......................... 717/124 |
| 7,861,072 B2 | * | 12/2010 | Duffy et al. .................... 712/244 |
| 8,146,085 B2 | * | 3/2012 | Duffy et al. .................... 718/100 |
| 2003/0018961 A1 | * | 1/2003 | Ogasawara .................... 717/158 |
| 2003/0177240 A1 | * | 9/2003 | Gulko et al. ................... 709/226 |
| 2004/0172626 A1 | * | 9/2004 | Jalan et al. ..................... 717/149 |
| 2005/0015437 A1 | * | 1/2005 | Strait ............................. 709/203 |
| 2008/0022281 A1 | * | 1/2008 | Dubhashi et al. ............. 718/102 |
| 2008/0077922 A1 | | 3/2008 | Doring |
| 2008/0320291 A1 | * | 12/2008 | Duffy et al. .................... 712/244 |
| 2009/0222825 A1 | * | 9/2009 | Upadhyaya et al. .......... 718/102 |
| 2011/0209153 A1 | * | 8/2011 | Suzuki et al. ................. 718/102 |

OTHER PUBLICATIONS

Leijen, Daan, et al., MSDN, Parallel Performance, "Optimize Managed Code for Multi-core Machines", 2009 Microsoft Corporation, 12 pages.
Toub, Stephen, MSDN, .Net Matters, "Aggregating Exceptions", 2009 Microsoft Corporation, 7 pages.
Ayguade, Eduard, et al., "The Design of OpenMP Tasks", IEEE Transactions on Parallel and Distributed Systems, vol. 20, No. 3, Mar. 2009, pp. 404-418.

* cited by examiner

*Primary Examiner* — Emerson Puente
*Assistant Examiner* — Charles Swift
(74) *Attorney, Agent, or Firm* — Workman Nydegger (57) ABSTRACT

The present invention extends to methods, systems, and computer program products for a structured task hierarchy for a parallel runtime. The parallel execution runtime environment permits flexible spawning and attachment of tasks to one another to form a task hierarchy. Parent tasks can be prevented from completing until any attached child sub-tasks complete. Exceptions can be aggregated in an exception array such that any aggregated exceptions for a task are available when the task completes. A shield mode is provided to prevent tasks from attaching to another task as child tasks.

20 Claims, 6 Drawing Sheets

STRUCTURED TASK HIERARCHY FOR A PARALLEL RUNTIME

CROSS-REFERENCE TO RELATED APPLICATIONS

Not Applicable.

BACKGROUND

1. Background and Relevant Art

Computer systems and related technology affect many aspects of society. Indeed, the computer system's ability to process information has transformed the way we live and work. Computer systems now commonly perform a host of tasks (e.g., word processing, scheduling, accounting, etc.) that prior to the advent of the computer system were performed manually. More recently, computer systems have been coupled to one another and to other electronic devices to form both wired and wireless computer networks over which the computer systems and other electronic devices can transfer electronic data. Accordingly, the performance of many computing tasks are distributed across a number of different computer systems and/or a number of different computing environments.

In some computing environments, a processor executes instructions serially. That is, one instruction is executed at a time and a new instruction is executed only when execution of the preceding instruction is finished.

In other computing environments, multiple processing units are used to execute multiple computational threads concurrently (or simultaneously). This is often referred to as "parallel processing" or "parallel computing." Parallel processing/computing operates on the principle that large problems can often be divided into smaller problems, that can then be solved concurrently or "in parallel."

When respect to executing instructions, a set of instructions (e.g., a sub-routine or module) representing an overall operation/problem can be divided into multiple smaller sub-sets of instructions (e.g., smaller sub-routines or modules). Separate threads of execution can be spawned for sub-sets of instructions. Instructions from the separate threads of execution are queued and then later de-queued one by one for execution by a processor. The results from the sub-sets of instructions are then combined to formulate a result for the overall operation/problem.

Thus, parallel processing can potentially result in faster executing programs, since at least some instructions can be executed without having to wait for the completion of other instructions. However, implementing parallel processing is also more complex relative to implementing sequential processing, since different threads have to communicate amongst one another to provide a meaningful result. The increased complexity of parallel processing leads to a number of difficulties that can reduce the benefits of any increase in execution speed. For example, parallel processing is subject to race conditions (a potential fault resulting from timing variations in accessing shared variables in the lack of proper synchronization)), deadlocks, synchronization difficulties, and parallel slow down (as communication between threads increases).

Most parallel computing environments or multithreading Application Program Interfaces ("APIS") contain facilities for perform waits and/or joins. Waits and/or joins can be performed at different levels, such as, for example, waiting on completion of a given thread, an individual sub-operation, or groups of sub-operations. However, within these parallel computing environments waits and joins typically require expressly define targets, such as, for example, which threads, sub-operations, etc. are to be joined or waited on. Unfortunately, the use of express targets causes developers to have to write additional code within their applications to track state between threads, sub-operations, etc., so that target information for waits and/or joins is available. Further, when interacting with code developed by others (e.g., external libraries), it may be difficult to track the state that is required for express waits and/or joins. Tracking states also becomes significantly more difficult as the number of levels in a hierarchy of sub-operations increases.

Further, many parallel computing environments lack an efficient mechanism to handle exceptions thrown from instruction sub-sets executing asynchronously on different threads. For example, when a sub-set of instructions throws an exception while executing on a different thread, the exception may be permitted to propagate to the back up to an originally calling portion of code and made accessible. However, there is limited value in the information contained in an exception, since it is difficult to determine the precise origin of the exception. These difficulties are compounded when sub-sets of instructions are further divided into sub-sub-sets of instructions, etc.

BRIEF SUMMARY

The present invention extends to methods, systems, and computer program products for a structured task hierarchy for a parallel runtime. In some embodiments, code is executing in accordance with a task hierarchy that divides processing into tasks. Execution of a task included in task hierarchy is initiated. A state object is used provide context for the task. A plurality of concurrently executable sub-tasks are spawned during the time the task is executing. Each sub-task is configured to perform an indicated portion of work related to the task.

For at least one of the plurality of concurrently executable sub-tasks, the sub-task is attached as a child task of the task within the task hierarchy. Accordingly, the task is also the parent task of the sub-task task within the task hierarchy. The attached sub-task is grouped with any other sub-tasks attached to the task within the context of the task. Completion of the parent task is prevented until the attached sub-task is complete.

Each of the plurality of concurrently executable sub-tasks is concurrently executed to perform the indicated portions of work related to the task. Each of the plurality of concurrently executable sub-tasks is concurrently executed with at least one other task at the computer system. Upon detecting that all attached sub-tasks have completed, the task is permitted to complete.

In other embodiments, exceptions are marshaled for code executed in accordance with a task hierarchy. A portion of code joins with execution of a task included in the task hierarchy. A state object is maintained to provide context for the task. The state object includes an exception array for storing exceptions thrown by any child sub-tasks of the task.

A plurality of concurrently executable sub-tasks are spawned during execution of the task. Each sub-task is configured to perform an indicated portion of work related to the task. The plurality of concurrently executable sub-tasks are concurrently executed to perform the portions of work related to the task. The task receives a plurality of exceptions thrown by a subset of the plurality of concurrently executable sub-tasks.

The task observes (handles) at least some of the plurality of exceptions within the context of the task provided by the state object. Any remaining exceptions not observed by the task are aggregated into the exception array. The remaining exceptions in the exception array are provided to the portion of code that joined with execution of the task.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

The present invention extends to methods, systems, and computer program products for a structured task hierarchy for a parallel runtime. In some embodiments, code is executing in accordance with a task hierarchy that divides processing into tasks. Execution of a task included in task hierarchy is initiated. A state object is used provide context for the task. A plurality of concurrently executable sub-tasks are spawned during the time the task is executing. Each sub-task is configured to perform an indicated portion of work related to the task.

For at least one of the plurality of concurrently executable sub-tasks, the sub-task is attached as a child task of the task within the task hierarchy. Accordingly, the task is also the parent task of the sub-task task within the task hierarchy. The attached sub-task is grouped with any other sub-tasks attached to the task within the context of the task. Completion of the parent task is prevented until the attached sub-task is complete.

Each of the plurality of concurrently executable sub-tasks is concurrently executed to perform the indicated portions of work related to the task. Each of the plurality of concurrently executable sub-tasks is concurrently executed with at least one other task at the computer system. Upon detecting that all attached sub-tasks have completed, the task is permitted to complete.

In other embodiments, exceptions are marshaled for code executed in accordance with a task hierarchy. A portion of code joins with execution of a task included in the task hierarchy. A state object is maintained to provide context for the task. The state object includes an exception array for storing exceptions thrown by any child sub-tasks of the task.

A plurality of concurrently executable sub-tasks are spawned during execution of the task. Each sub-task is configured to perform an indicated portion of work related to the task. The plurality of concurrently executable sub-tasks are concurrently executed to perform the portions of work related to the task. The task receives a plurality of exceptions thrown by a subset of the plurality of concurrently executable sub-tasks.

The task observes (handles) at least some of the plurality of exceptions within the context of the task provided by the state object. Any remaining exceptions not observed by the task are aggregated into the exception array. The remaining exceptions in the exception array are provided to the portion of code that joined with execution of the task.

Embodiments of the present invention may comprise or utilize a special purpose or general-purpose computer including computer hardware, including processors and system memory, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: computer storage media and transmission media.

Computer storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Within this description and the following claims, a "task" is defined as a work item that represents a small portion of the processing that the application needs to perform. A task can include a sub-routine (aka "task delegate") and state variables that the sub-routine utilizes to execute. A task can be prepared by a developer in such a way that it is safe for concurrent execution along with other similar tasks.

Within this description and the following claims, a "directed acyclic graph" ("DAG") is a directed graph formed by a collection of vertices and directed edges, each edge connecting one vertex to another. The edges are connected such that traversal from a particular vertex back to the particular vertex is not possible. Tasks can be arranged in a DAG forming parent/child relationships. A task higher in a DAG can be a parent task to one or more other child tasks lower in the task hierarchy. Similarly, a task lower in the task hierarchy can be a child task to one or more other parent tasks higher in the DAG.

Within this description and the following claims, a "hierarchy" is a type of DAG where each child has one parent.

Within this description and the following claims, a "task hierarchy" is a hierarchy of tasks. Within a task hierarchy, tasks can be attached to one another to form parent/child relationships. A task higher in the task hierarchy can be a parent task to one or more other child tasks lower in the task hierarchy. A task lower in the task hierarchy can be a child task to one parent task higher in the task hierarchy.

Within this description and the following claims, "task waiting" is defined as a programming facility that blocks the thread on which the call was executing until the completion of the target task (e.g., asking the operating system to stop running a the thread that called Wait( ) until an external signal arrives, such as, a signal originating from the target task as its last action). In some embodiments, task waiting can be implemented through an express Application Program Interface ("API") for waiting on a task. In these embodiments, the default behavior is not tasking waiting and code opts in to task waiting through calls to the express API. In other embodiments, task waiting is built into the parallel execution runtime. In these other embodiments, the default behavior is task waiting and code opts out of call waiting through calls to APIs.

Figure 1:
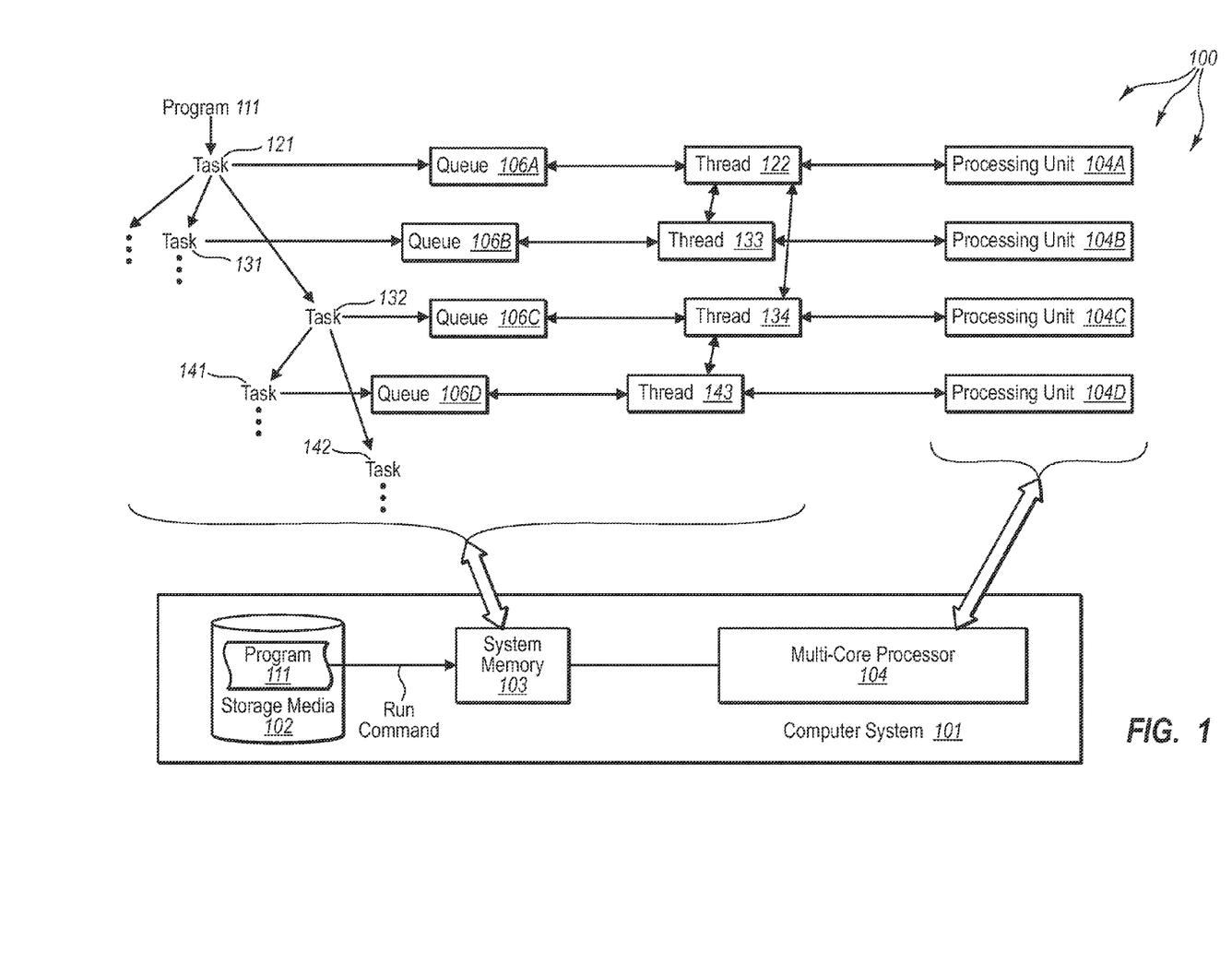
FIG. 1 illustrates an example computer architecture that facilitates a parallel execution runtime.

FIG. 1 illustrates an example computer architecture 100 of a parallel execution runtime. Referring to FIG. 1, computer architecture 100 includes computer system 101, which further includes storage media 102, system memory 103, multi-core processor 104. Computer system 101, as well as include components, can be connected to (or be part of) a network, such as, for example, a Local Area Network ("LAN"), a Wide Area Network ("WAN"), and even the Internet. Accordingly, computer system 101 as well as any other and its components, can create message related data and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), etc.) over the network.

Generally, computer architecture 100 can be used to facilitate parallel execution of tasks for a program. For example, a run command can cause program 111 to be executed. During execution, program 111 can spawn various tasks, such as, for example, tasks 121, 131, 132, 141, and 142, during execution. Tasks can be spawned, perform specified operations, and then complete and go away. Each task that is spawned can be executed in its own thread. For example, task 121 can be executed in thread 122, task 131 can be executed in thread 133, task 132 can be executed in thread 134, task 141 can be executed in thread 143, task 142 can be executed in thread 144, etc.

Multi-core processor 104 includes processing units 104A-104D. Queues 106A-106D queue items that are to utilize processing resources of processing units 104A-104D respectively. Processing units 104A-104D can process items concurrently.

Generally, threads can submit items that are to utilize processing resources to queues. A processing unit can process items queued in their corresponding queue on a First In First Out ("FIFO") basis. Upon completion of processing, the processing unit can return results of the processing back to the appropriate thread. Threads can communicate between one another so that intermediate results from concurrently executed tasks can be combined into more complete results. For example, threads 133 and 134 can communicate intermediate results to thread 122 such that thread 122 can combine the intermediate results from tasks 131 and 132 into a result for task 121

In some embodiments, tasks form a task hierarchy. A task hierarchy can be formed by attaching tasks to one another to form parent/child relationships. Within a task hierarchy, a parent task can be prevented from completing until its child tasks complete. The configuration of a task hierarchy can change during execution of a program as tasks are spawned and completed.

Figure 2:
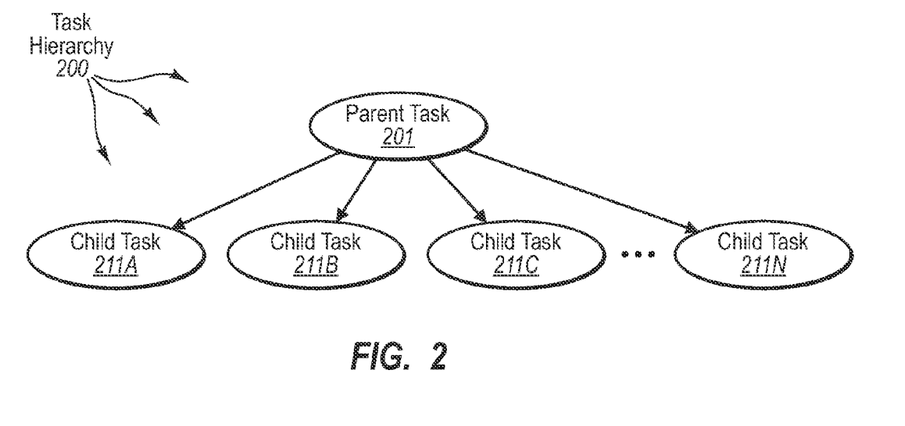
FIG. 2 illustrates an example task hierarchy.

FIG. 2 illustrates an example task hierarchy 200. Task hierarchy 200 depicts a single level task hierarchy, where a parent task spawns N child tasks at various points in its own delegate's execution (where N represents some integer). As depicted, task hierarchy 200 includes parent task 201 and child tasks 211A, 211B, 211C through 211N. The existence of child tasks 211A, 211B, 211C through 211N implies that parent task 201 transitions to a completed state after tasks 211A, 211B, 211C through 211N transition to a completed sate, even if parent task 201's delegate finishes executing earlier. The following pseudo-code represents instructions for creating task hierarchy 200:

```
{
    Task parentTask201 = Task.Factory.StartNew(( ) =>
    {
        Task child211A = StartNewTask(( ) =>
            { DoSomeWork("child211A"); },
            TaskOptions.AttachedToParent);
        Task child211B = StartNewTask(( ) =>
            { DoSomeWork("child211B"); },
            TaskOptions.AttachedToParent);
        Task child211C = StartNewTask(( ) =>
            { DoSomeWork("child211C"); },
            TaskOptions.AttachedToParent);
        // ...
        Task child211N = StartNewTask(( ) =>
            { DoSomeWork("child211N"); },
            TaskOptions.AttachedToParent);
    });
    parentTask.Wait( );
}
```

As depicted, there is a single Wait( ) call for the parent task 201 and no express waits for child tasks. Waits for child tasks can be built into the runtime (e.g., into the parallel execution runtime depicted in computer architecture 100) as a result of spawning child tasks with the TaskOptions.AttachedToParent option.

Figure 3:
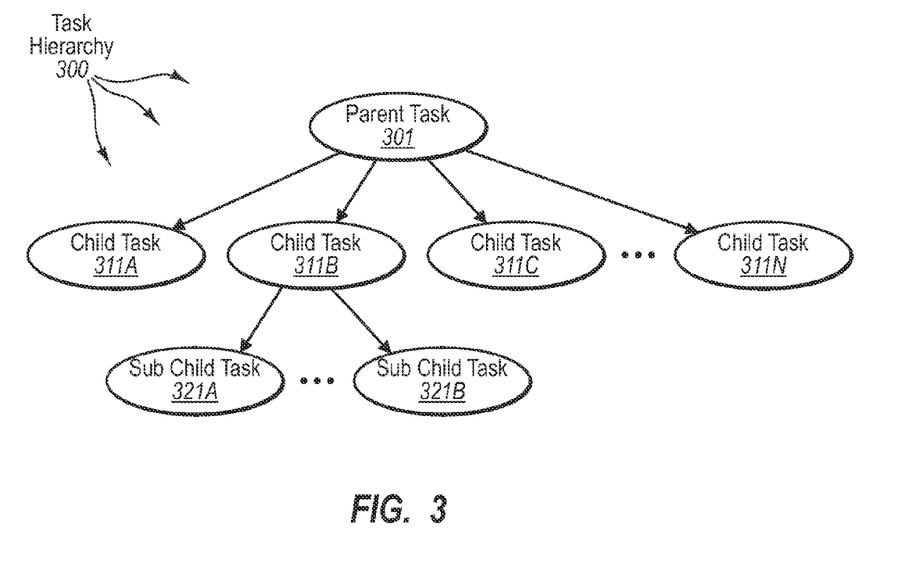
FIG. 3 illustrates an example task hierarchy.

FIG. 3 illustrates an example task hierarchy 300. Task hierarchy 200 depicts a two level task hierarchy. A parent task spawns N child tasks at various points in the parent task delegate's execution (where N represents some integer) and its second child task then spawns further children tasks at various points in the second child task delegate's execution. As depicted, task hierarchy 300 includes parent task 301, child tasks 311A, 311B, 311C through 311N, and sub child tasks 321A and 321B.

Similar to task hierarchy 200, the existence of child tasks 311A, 311B, 311C through 311N implies that that parent task 301 transitions to a completed state after tasks 311A, 311B, 311C through 311N transition to a completed sate, even if parent task 301's delegate finishes executing earlier. Further, since child task 211B is also a parent task of sub child tasks 321A and 321B, child task 211B transitions to a completed state after tasks 321A and 321B transmission to a completed state, even if child task 311B's delegate finishes executing earlier. Thus, it further follows that parent task 301 transitions to a completed state after sub child tasks 321A and 321B transition to a completed state. That is, parent task 301 (the root-most parent task depicted) implicitly has to wait on sub child tasks 321A and 321B (the second level of children).

The following pseudo-code represents instructions for creating task hierarchy 300:

```
{
    Task parentTask301 = Task.Factory.StartNew(( ) =>
    {
        Task child311A = StartNewTask(( ) =>
            { DoSomeWork("child311A"); },
            TaskOptions.AttachedToParent);
        Task child311B = StartNewTask(( ) =>
        {
            Task subChild321A = StartNewTask(( ) =>
                { DoSomeWork("sub321A"); },
                TaskOptions.AttachedToParent);
            // ...
            Task subChild321B = StartNewTask(( ) =>
                { DoSomeWork("sub321B"); },
                TaskOptions.AttachedToParent);
            DoSomeWork("child311B");
        }, TaskOptions.AttachedToParent);
        Task child311C = StartNewTask(( ) =>
            { DoSomeWork("child311C"); },
            TaskOptions.AttachedToParent);
        // ...
        Task child311N = StartNewTask(( ) =>
            { DoSomeWork("child311N"); },
            TaskOptions.AttachedToParent);
    });
    parentTask.Wait( );
}
```

Generally, a task hierarchy can include an arbitrary number of levels (as configured in the code that is executing). For example, it may be that sub child tasks 321A and/or 321B are parent tasks to one or more further child tasks. Any of the one or more further child tasks can also be parent tasks additional child tasks, etc.

Attachment of a task to a task hierarchy is optional. Thus, some spawned tasks can be attached to a task hierarchy. However, other spawned tasks are not attached to a task hierarchy. Non-attached tasks can be executed concurrently with attached tasks. A task that spawns a non-attached sub-task is permitted to transition to a complete state prior to the non-attached task transitioning to a complete state.

A task can spawn a sub-task that is automatically attached to the task within the context of the task. As such, the task becomes the parent task to the sub-task and the sub-task becomes a child task of the task. Additionally, one task can spawn a sub-task expressly targeted for attachment to another different task within the context of the other different task. As such, the other different task becomes the parent of the sub-task and the sub-task becomes a child task of the other different task. A task that spawns sub-task that is attached to a different task is permitted to transition to a complete state prior to the task transitioning to a complete state.

Accordingly, a developer is given flexibility to develop applications that include both attached and non-attached concurrently executable tasks. Further, a developer is able to flexibly control the spawning and attachment of sub-tasks between different tasks.

In some embodiments, per object and global internal state variables are maintained by a parallel execution runtime in order to support task waiting and exception aggregation. These internal state variables can be maintained in a state object for each task. A state object can be expressed in a variety of different languages. One example of a state object is declared in the following pseudo-code:

```
class Task
{
...
    [ThreadStatic] Task s_currentTask;
    Task m_parent;
    int m_completionCountdown;
    List<Exception> m_exceptionHolder;
    List<Task> m_exceptionalChildren;
    bool m_exceptionObservedByParent;
    bool m_shieldedTask;
...
}
```

The fields in the state objectas declared in the pseudo-code:

Current Task Reference (s_currentTask): For each worker thread participating in the parallel execution system, a thread local static reference can be maintained to store the current executing task. Current Task Reference can be kept up to date by the runtime when a worker thread starts invoking a new task.

Parent Task Pointer (m_parent): Each task object contains a reference to its parent task. If the task is not attached to a parent, this is set to null Completion Countdown (m_completionCountdown): Each task object contains an integer field indicating how many outstanding (not yet completed) child tasks are associated with it. In some embodiments, when a new child is spawned completion countdown is incremented. On the other hand, when a child completes completion countdown is decremented. When completion countdown for a task is zero, the task is permitted to complete.

Exception Array (m_exceptionHolder): A list of exceptions that were thrown by the child tasks attached to this task Exceptional Child Task Array (m_exceptionChildren): A collection of child task references which have finished with an exception, but which haven't yet been observed by the parent task (while the parent delegate is still running). Lazily allocated Exception Observed By Parent Flag (m_exceptionObservedByParent): Indicates whether or not an exception has been observed by a parent task. When a parent task observes an exception, the exception is resolved, thereby eliminating the need to propagate the exception up the hierarchy.

Shielded Task Flag (m_shieldedTask): Indicates whether or not a task can have children tasks attached to it. Can be set or unset by a specific instance API or option flags used at initialization time.

Accordingly, the life cycle of a task from the point of view of a child task can be implemented in accordance with the following algorithms for task initialization and task completion:

1) At task initialization time, check s_currentTask, if it's not null and s_currentTask.m_shildedTask is false
   a. set m_parent=s_currentTask
   b. call m_parent.AddNewChild( ), which increments m_parent.m_completionCountdown
2) When the task is complete call, if m_parent is not null
   a. call m_parent.ProcessChildCompletion( ), (which decrements m_parent.m_completionCountdown, and if child task has an exception records its reference intto m_parent.m_exceptionalChildren as described below)

Further, the life cycle of a task from the point of view of a parent task can be implemented in accordance with the following algorithm:

1) When task delegate (i.e., child) exits, run FinishStage1( ), which does initial cleanup of state in task.
2) If m_completionCount is 0, run FinishStage2( ) which runs final state transition, calls m_parent.ProcessChildCompletion( ) (to notify this task's parent, if any), and does final cleanup
3) If m_completionCount is greater than 0, yield control to worker thread. (Final state transition and cleanup will be triggered by the last child task to finish when they call this task's ProcessChildCompletion( ))

Figure 6:
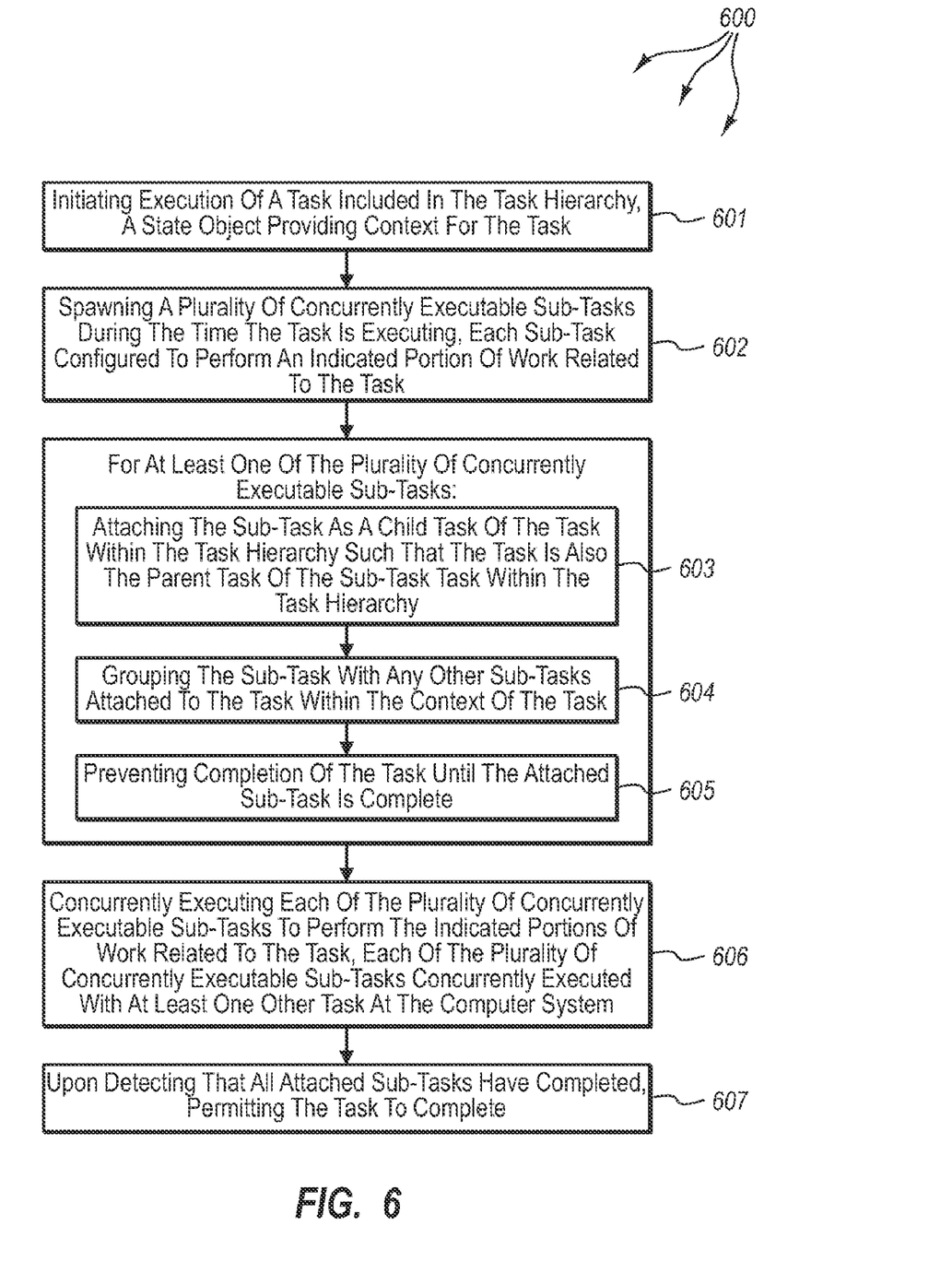
FIG. 6 illustrates a flow chart of an example method for executing code in accordance with a task hierarchy.

ProcessChildCompletion( ) can be implemented to include the following functionality:

1) If calling task has an exception, add its reference to this task object's m_exceptionalChildrenList
   a. When certain criteria are met (e.g. size of this array being larger than a threshold etc), prune m_exceptionalChildrenList by walking all of its elements and removing those references which have their m_exceptionObservedByParent flag set to true
2) Decrement this task object's m_completionCountdown field. If new value is greater than 0, return from function
3) If new completion countdown value is 0, proceed with finishing this task by calling FinishStage2( ) which will
   a. Do final state transition
   b. If this task has a parent, call m_parent.ProcessChildCompletion( )
   c. Perform last remaining state cleanup, and completion actions necessary FIGS. 4A-4F illustrates an example task hierarchy 400 for executing code in accordance with a task hierarchy. FIG. 6 illustrates a flow chart of an example method 600 for executing code in accordance with a task hierarchy. Method 600 will be described with respect to the tasks in task hierarchy 400.

Figure 4A:
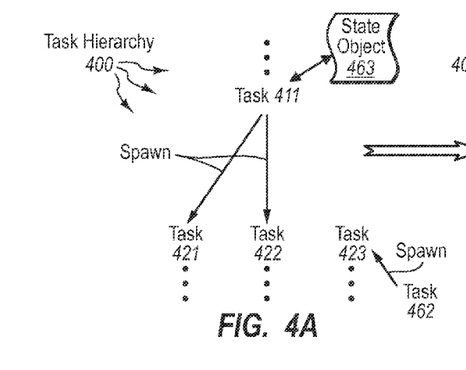
FIGS. 4A-4F illustrates an example task hierarchy for executing code in accordance with a task hierarchy.
Figure 4B:
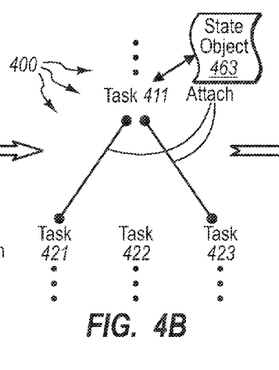
Figure 4C:
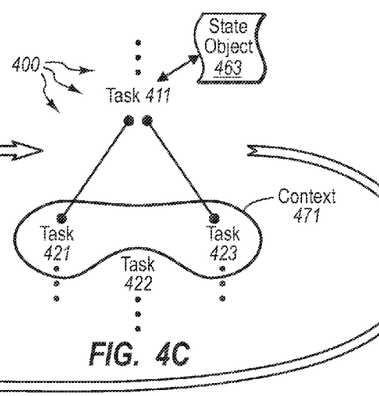
Figures 4D, 4E:
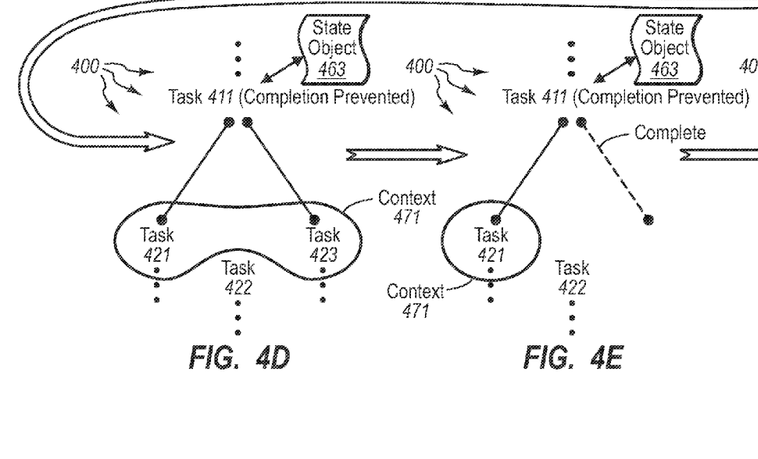

Method 600 includes an act of initiating execution of a task included in the task hierarchy, a state object providing context for the task (act 601). For example, task 411 can be initiated within task hierarchy 400. State object 463 provides context for task 411. Task 411 can be an initial task included in task hierarchy 411 (e.g., an initial task spawned by an application, a task spawned by another task as an unattached sub-task, etc). Alternately, task 411 can be a sub-task that is attached as a child task to another task included task hierarchy 400. State object 463 can include state related to task 411, such as, for example, a current task reference, a parent task pointer, an indicating of any outstanding attached child tasks, and exception information related to child tasks, and can potentially be a state object as previously described, which provides a context for task 411.

Method 600 includes an act of spawning a plurality of concurrently executable sub-tasks during the time the task is executing, each sub-task configured to perform an indicated portion of work related to the task (act 602). For example in FIG. 4A, tasks 421, 422, and 423 can be spawned during the time task 411 is executed (i.e., before task 411 transitions to a complete state). Task 411 can spawn tasks 421 and 422 and task 462 can spawn task 423. Tasks 421, 422, and 423 can be configured to perform portions of work related to task 411.

For at least one of the plurality of concurrently executable sub-tasks, method 600 includes an act of attaching the sub-task as a child task of the task within the task hierarchy such that the task is also the parent task of the sub-task task within the task hierarchy (act 603). For example in FIG. 4B, task 421 can attach as a child task of task 411 within task hierarchy 400. Similarly, task 423 can attach as a child task of task 411 within task hierarchy 400. Thus, task 411 is the parent task to tasks 421 and 423. Task 422 does not attach to task hierarchy 400. Task 422 can remain unattached or can potentially attached to a different task hierarchy.

For at least one of the plurality of concurrently executable sub-tasks, method 600 includes an act of grouping the sub-task with any other sub-tasks attached to the task within the context of the task (act 604). For example in FIG. 4C, tasks 421 and 423 can be grouped together in context 471. Context 471 can be provided based on information contained in state object 463.

For at least one of the plurality of concurrently executable sub-tasks, method 600 includes an act of preventing completion of the task until the attached sub-task is complete (act 605). For example in FIG. 4D, task 411 is prevented from transitioning to a completed state until after tasks 421 and 423 transitioned to a complete state.

Method 600 includes an act of a concurrently executing each of the plurality of concurrently executable sub-tasks to perform the indicated portions of work related to the task, each of the plurality of concurrently executable sub-tasks concurrently executed with at least one other task at the computer system (act 606). For example, tasks 421, 422, and 423 can be concurrently executed with one another (e.g., at different processing units, such as, 104A-104C) to perform portions of work related to task 411.

Figure 4F:
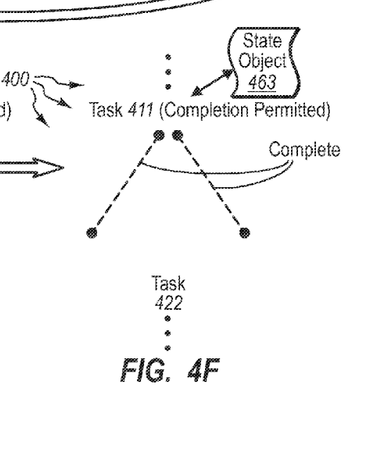
Figure 5A:
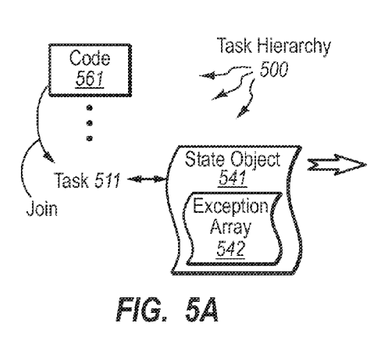
FIG. 5A-5F illustrates an example task hierarchy for aggregating exceptions in accordance with a task hierarchy.
Figure 5B:
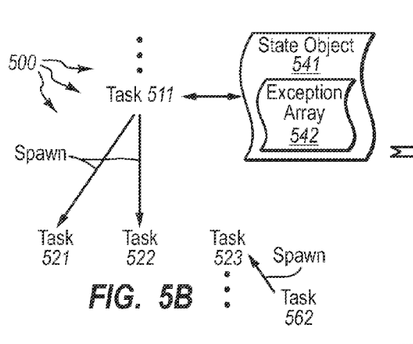
Figure 5C:
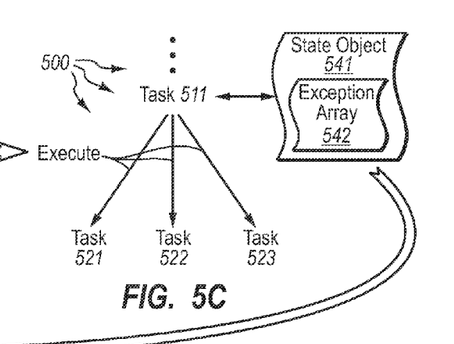
Figure 5D:
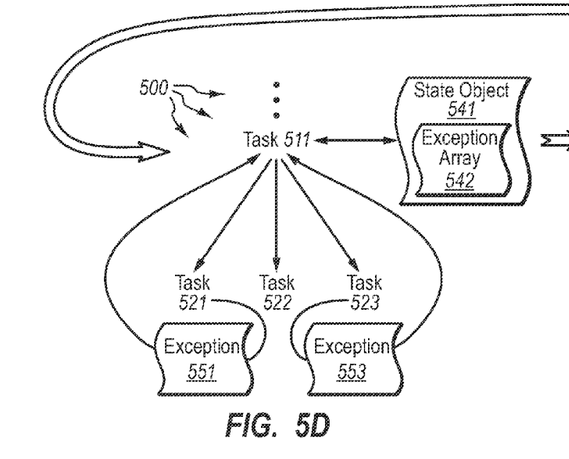
Figure 5E:
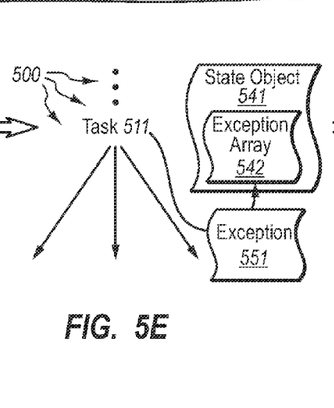
Figure 5F:
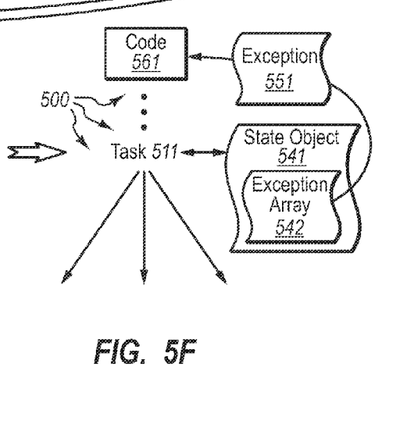

Upon detecting that all attached sub-tasks have completed, method 600 includes an act of permitting the task to complete (act 607). For example in FIG. 4E, task 423 transitions into a completed state. However, task 411 remains prevented from transitioning to a complete state, since task 421 has not yet transitioned to a complete state. Turning to FIG. 4F, task 421 subsequently transitions to a complete state. Upon detecting the transition of task 421 (i.e., the last remaining attached child task) to a complete state, task 411 is unblocked and permitted to transition to a complete state.

In some embodiments, a parent task transitions itself to a completed state. For example, when a parent task's delegate quits and finds that all children tasks are finished, the parent task takes care of transitioning itself to a completed state. In other embodiments, a child task takes care of transitioning its parent task to a completed state. For example, when a parent task's delegate quits it may find that one or more children tasks are still remaining. When one or more child tasks are still running, control of parent task's thread is yielded and completion of the parent task is attended to by the last child task (i.e., on another thread).

Figure 7:
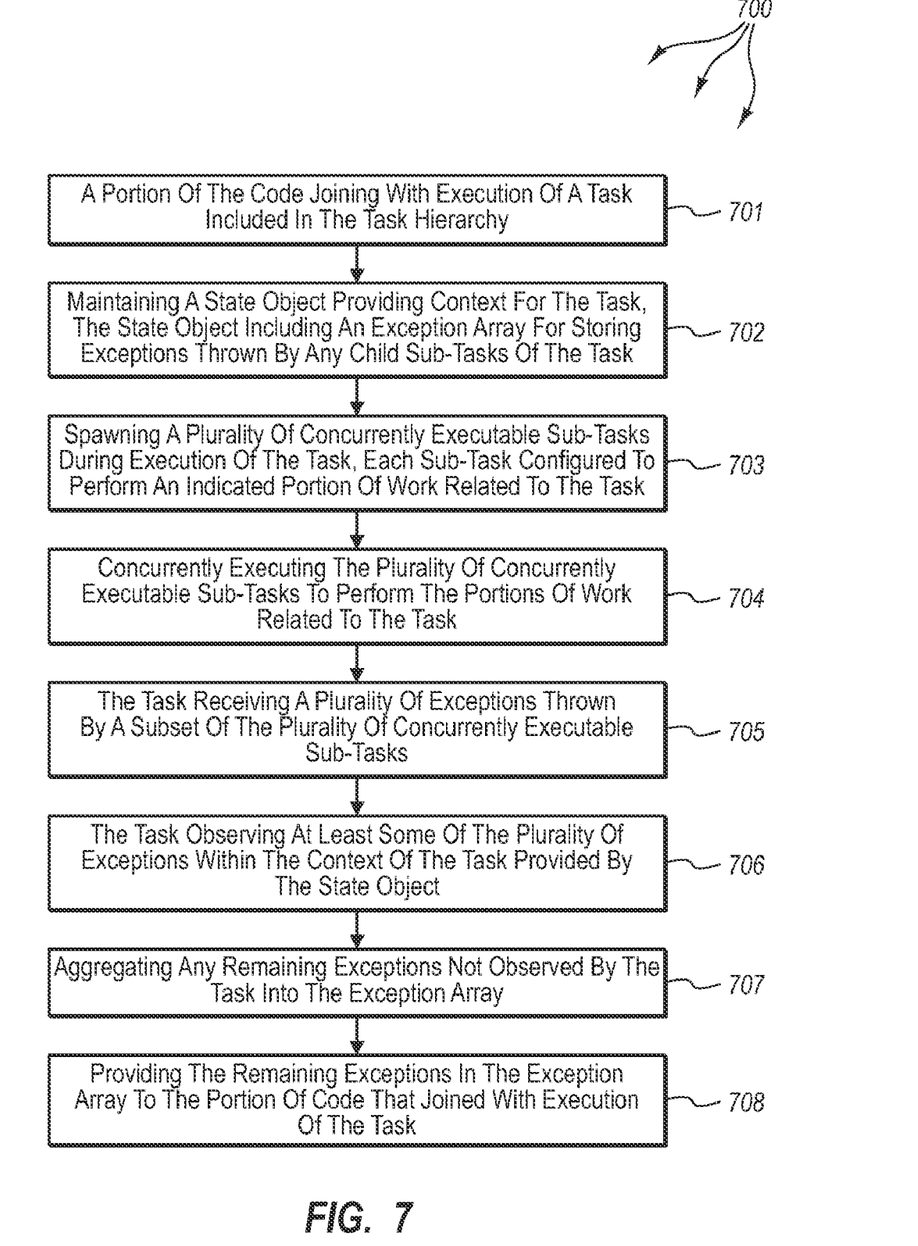
FIG. 7 illustrates a flow chart of an example method for marshaling exceptions for code executed in accordance with a task hierarchy.

FIGS. 5A-5F illustrates an example task hierarchy 400 for executing code in accordance with a task hierarchy. FIG. 7 illustrates a flow chart of an example method 700 for executing code in accordance with a task hierarchy. Method 700 will be described with respect to the tasks in task hierarchy 500.

Method 700 includes an act of a portion of the code joining with execution of a task included in the task hierarchy (act 701). For example in FIG. 5A, code 561 can join with execution of task 511 included in task hierarchy 500. Method 700 includes an act of maintaining a state object providing context for the task, the state object including an exception array for storing exceptions thrown by any child sub-tasks of the task (act 702). For example, state object 541, including exception array 542, can be maintained for task 511. Exception array 542 can be used to store exceptions thrown by any child sub-tasks attached to task 511.

Method 700 includes an act of spawning a plurality of concurrently executable sub-tasks during execution of the task, each sub-task configured to perform an indicated portion of work related to the task (act 703). For example in FIG. 5B, task 511 can spawn tasks 521 and 522 and task 562 can spawn task 523. Each of tasks 521, 522, and 523 is configured to perform an indicated portion of work related to task 511.

Method 700 includes an act of concurrently executing the plurality of concurrently executable sub-tasks to perform the portions of work related to the task (act 704). For example in FIG. 5C, tasks 521, 522, and 523 can be concurrently executed with one another (e.g., at different processing units, such as, 104A-104C) to perform portions of work related to task 511. Method 700 includes an act of the task receiving a plurality of exceptions thrown by a subset of the plurality of concurrently executable sub-tasks (act 705). For example in FIG. 5D, tasks 521 and 523 can throw exceptions 551 and 553 respectively. Task 511 can receive exceptions 551 and 553 from tasks 521 and 523 respectively.

Method 700 includes an act of the task observing at least some of the plurality of exceptions within the context of the task provided by the state object (act 706). For example in FIG. 5E, task 511 can observe (or appropriately address) exception 553. Method 700 includes an act of aggregating any remaining exceptions not observed by the task into the exception array (act 707). For example, task 511 can aggregate exception 551 along with other exceptions in exception array 542. Method 700 includes an act of providing the remaining exceptions in the exception array to the portion of code that joined with execution of the task (act 708). For example in FIG. 5F, task 511 can provide exception 551 to code 561.

In a multi-level task hierarchy (e.g., task hierarchy 300), exceptions can be propagated up the task hierarchy until observed by a task or if not observed returned to the calling program. As such, an exception array can be represented as a multi-level collection that essentially mirrors the task hierarchy from which the exceptions were thrown. From time to time, an exception array can be pruned to remove any exceptions stored in the exception array that have been subsequently observed. Pruning can be free up memory resources (e.g., of system memory 103).

Embodiments of the invention can also be practiced with other forms of directed acyclic graphs, including directed acyclic graphs where one or more child tasks have multiple parent tasks.

Accordingly, embodiments of the invention provide a parallel execution runtime environment. The parallel execution runtime environment permits flexible spawning and attachment of tasks to one another to form a task hierarchy. Parent tasks can be blocked from completed until any attached child sub-tasks complete. Exceptions can be aggregated in an exception array such that any aggregated exceptions for a task are available when the task completes. A shield mode is provided to prevent tasks from attaching to another task as child tasks.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. At a computer system including one or more processors and system memory, a method for executing code in accordance with a task directed acyclic graph that divides processing into tasks, the method comprising:
   an act of initiating execution of a task included in the task directed acyclic graph;

an act of spawning a plurality of concurrently executable sub-tasks during the time the task is executing, each sub-task configured to perform an indicated portion of work related to the task;

for each of the plurality of concurrently executable sub-tasks:
- an act of attaching the sub-task as a child task of the task within the task directed acyclic graph such that the task is also the parent task of the sub-task task within the task directed acyclic graph;
- an act of grouping the sub-task with any other sub-tasks attached to the task within the context of the task; and
- an act of preventing completion of the task until the attached sub-task is complete;

an act of a multi-core processor concurrently executing each of the plurality of concurrently executable sub-tasks to perform the indicated portions of work related to the task, each of the plurality of concurrently executable sub-tasks concurrently executed with at least one other task at the computer system;

an act of the task receiving a plurality of exceptions thrown by a subset of the plurality of concurrently executable sub-tasks;

an act of the task observing at least some of the plurality of exceptions within the context of the task provided by a state object;

an act of aggregating remaining exceptions not observed by the task into an exception array;

an act of providing the remaining exceptions in the exception array to a portion of code that is joined with execution of the task; and upon detecting that all attached sub-tasks have completed, an act of permitting the task to complete.

2. The method as recited in claim 1, further comprising for at least one of the plurality of concurrently executable sub-tasks, an act of setting the value of a shielded task flag to a value that prevents other tasks from attaching as a child task to the at least one sub-task.

3. The method as recited in claim 1, wherein the act of initiating execution of a task included in the task directed acyclic graph comprises an act of initiating a task that is a root task in a task hierarchy.

4. The method as recited in claim 1, wherein the act of initiating execution of a task included in the task directed acyclic graph comprises an act of initiating a task that is a child task of another task in a task hierarchy.

5. The method as recited in claim 1, wherein the act of spawning a plurality of concurrently executable sub-tasks during the time the task is executing comprises an act of another different task spawning a sub-task included in the plurality of concurrently executable sub-tasks, the other different task being different than the task.

6. The method as recited in claim 5, wherein the act of attaching the sub-task as a child task of the task within the task directed acyclic graph comprises an act of attaching the sub-task spawned by the other different task as a child task of the task.

7. The method as recited in claim 1, wherein an act of grouping the sub-task with any other sub-tasks attached to the task within the context of the task comprises an act of grouping the sub-task with other sub-tasks based on the value of a parent task pointer for the sub-tasks and the other sub-tasks.

8. The method as recited in claim 1, further comprising an act of the task's delegate terminating successfully.

9. The method as recited in claim 8, wherein the act of task's delegate terminating successfully comprises act of task's delegate terminating successfully subsequent to completion all attached sub-tasks; and further comprising:
an act of the task transitioning the task to a completed state.

10. The method as recited in claim 8, wherein the act of parent task's delegate terminating successfully comprises act of parent task's delegate terminating successfully prior to completion all attached sub-tasks; and further comprising:
- an act of yielding control of the task's thread to the non-completed sub-tasks; and
- an act of the last sub-task to complete transitioning the task to a completed state.

11. The method as recited in claim 1, further comprising upon detecting that all attached sub-tasks have completed, an act of unblocking any threads that may have previously blocked by the tasks wait Application Program Interface ("API").

12. A computer program product comprising one or more computer storage media having stored thereon computer-executable instructions that, when executed by a multi-core processor of a computer system, cause the computer system to implement a method for executing code in accordance with a task directed acyclic graph that divides processing into tasks, the method comprising:
- an act of a portion of the code joining with execution of a task included in the task directed acyclic graph;
- an act of maintaining a state object providing context for the task, the state object including an exception array for storing exceptions thrown by any child sub-tasks of the task;
- an act of initiating execution of a task included in the task directed acyclic graph;
- an act of spawning a plurality of concurrently executable sub-tasks during execution of the task, each sub-task configured to perform an indicated portion of work related to the task;
- for each of the plurality of concurrently executable sub-tasks:
  - an act of attaching the sub-task as a child task of the task within the task directed acyclic graph such that the task is also the parent task of the sub-task task within the task directed acyclic graph;
  - an act of grouping the sub-task with any other sub-tasks attached to the task within the context of the task; and
  - an act of preventing completion of the task until the attached sub-task is complete;
- an act of the multi-core processor concurrently executing each of the plurality of concurrently executable sub-tasks to perform the portions of work related to the task, each of the plurality of concurrently executable sub-tasks concurrently executed with at least one other task at the computer system;
- an act of the task receiving a plurality of exceptions thrown by a subset of the plurality of concurrently executable sub-tasks;
- an act of the task observing at least some of the plurality of exceptions within the context of the task provided by the state object;
- an act of aggregating remaining exceptions not observed by the task into the exception array;
- an act of providing the remaining exceptions in the exception array to the portion of code that joined with execution of the task; and
- upon detecting that all attached sub-tasks have completed, an act of permitting the task to complete.

13. The computer program product as recited in claim 12, wherein an act of a portion of the code joining with execution of a task included in the task directed acyclic graph comprises an act of another task above the task in a task hierarchy spawning the task.

14. The computer program product as recited in claim 12, wherein the act of maintaining a state object comprising an act of maintain a state object that includes an exception array and one or more of the following: a current task reference, a parent task pointer, a complete countdown, an exceptional child task array, and a shielded task flag.

15. The computer program product as recited in claim 14, wherein the act of maintaining a state object comprises an act of maintaining a state object that includes a shielded flag, the value of the shield flag indicating that other tasks are permitted to attach to the task as child tasks.

16. The computer program product as recited in claim 12, further comprising an act of one or more of the plurality of spawned concurrently executable sub-tasks attaching to the task as a child task of the task.

17. The computer program product as recited in claim 12, wherein the act of aggregating any remaining exceptions not observed by the task into the exception array comprises an act of aggregating any remaining exceptions into a multi-level exception array that mirrors the levels of the task directed acyclic graph.

18. The computer program product as recited in claim 12, further comprising:
  an act of the task observing one or more exceptions previously stored in the exception array by other tasks; and
  an act of removing the observed exceptions from the exception array.

19. The computer program product as recited in claim 12, wherein the act of aggregating remaining exceptions not observed by the task into the exception array comprises an act of aggregating one of: all remaining exceptions into the exception array or any remaining exceptions into the exception array.

20. A computer system comprising:
  a multi-core processor;
  system memory; and
  one or more computer storage media having stored thereon computer executable instructions representing a parallel execution runtime, the parallel execution runtime configured to:
  initiate execution of a task included in the task hierarchy, a state object providing context for the task;
  spawn a plurality of concurrently executable sub-tasks during the time the task is executing, each sub-task configured to perform an indicated portion of work related to the task;
  for each of the plurality of concurrently executable sub-tasks:
    attach the sub-task as a child task of the task within the task directed acyclic graph such that the task is also the parent task of the sub-task task within the task directed acyclic graph;
    group the sub-task with any other sub-tasks attached to the task within the context of the task; and
    prevent completion of the task until the attached sub-task complete so that exceptions for the attached sub-tasks can be appropriately aggregated;
  concurrently execute each of the plurality of concurrently executable sub-tasks to perform the indicated portions of work related to the task, each of the plurality of concurrently executable sub-tasks concurrently executed with at least one other task at the computer system;
  receive a plurality of exceptions thrown by a subset of the plurality of concurrently executable sub-tasks;
  observe at least some of the plurality of exceptions within the context of the task provided by the state object;
  aggregate any remaining exceptions not observed by the task into an exception array;
  provide the remaining exceptions in the exception array to a portion of code that is joined with execution of the task; and upon detecting that all attached sub-tasks in the subset of sub-task have completed, permit the task to complete.

* * * * *